United States Patent
Koenig et al.

(10) Patent No.: US 11,604,085 B1
(45) Date of Patent: Mar. 14, 2023

(54) AIRFLOW MEASUREMENT DEVICE FOR AIRFLOW MEASURING

(71) Applicant: The Energy Conservatory, Inc., Minneapolis, MN (US)

(72) Inventors: Kris H. Koenig, Minneapolis, MN (US); Steven B. Rogers, Minneapolis, MN (US)

(73) Assignee: The Energy Conservatory, Inc., Minneapolis, MN (US)

( * ) Notice: Subject to any disclaimer, the term of this patent is extended or adjusted under 35 U.S.C. 154(b) by 228 days.

(21) Appl. No.: 17/222,224

(22) Filed: Apr. 5, 2021

Related U.S. Application Data

(60) Provisional application No. 63/005,653, filed on Apr. 6, 2020.

(51) Int. Cl.
*G01F 1/42* (2006.01)
*G01F 15/063* (2022.01)
*G01F 1/50* (2006.01)

(52) U.S. Cl.
CPC .................. *G01F 1/42* (2013.01); *G01F 1/50* (2013.01); *G01F 15/063* (2013.01)

(58) Field of Classification Search
CPC ................................ G01F 1/40; G01N 1/2273
See application file for complete search history.

(56) References Cited

U.S. PATENT DOCUMENTS

| | | | |
|---|---|---|---|
| 6,439,061 B1 | 8/2002 | Nelson et al. | |
| 8,186,230 B1 * | 5/2012 | Kelley | G01F 1/42 73/861.42 |
| 8,939,036 B2 * | 1/2015 | Kelley | G01F 1/40 73/861.42 |
| 9,121,738 B2 * | 9/2015 | Sano | H05K 7/20836 |
| 9,857,209 B2 * | 1/2018 | Ishihara | G01F 1/36 |
| 10,175,669 B2 * | 1/2019 | Karamanos | F24F 11/74 |
| 2012/0285262 A1 * | 11/2012 | Kelley | G01F 1/40 73/861.42 |
| 2018/0172561 A1 * | 6/2018 | Kocher | G01N 1/2226 |
| 2021/0207833 A1 * | 7/2021 | Dameno | F24F 11/46 |

* cited by examiner

*Primary Examiner* — Freddie Kirkland, III
(74) *Attorney, Agent, or Firm* — Hamre, Schumann, Mueller & Larson, P.C.

(57) ABSTRACT

An airflow measurement device that is configured to measure airflow in an air handling system. The airflow measurement device can include a flow conditioning plate formed with a plurality of plate apertures or holes. A flow sensor is associated with each aperture. The flow sensors can be any type(s) of flow sensors that are suitable for sensing or characterizing one or more aspects of air flowing into and through the apertures, such as pitot sensors, vane anemometers, hot wire anemometers, or the like. The flow sensors can be used to quantify the volumetric airflow rate of the airflow, the speed of the airflow, or any other variable of the airflow from which one can formulate a judgment about the operating efficiency of the air handling equipment.

19 Claims, 15 Drawing Sheets

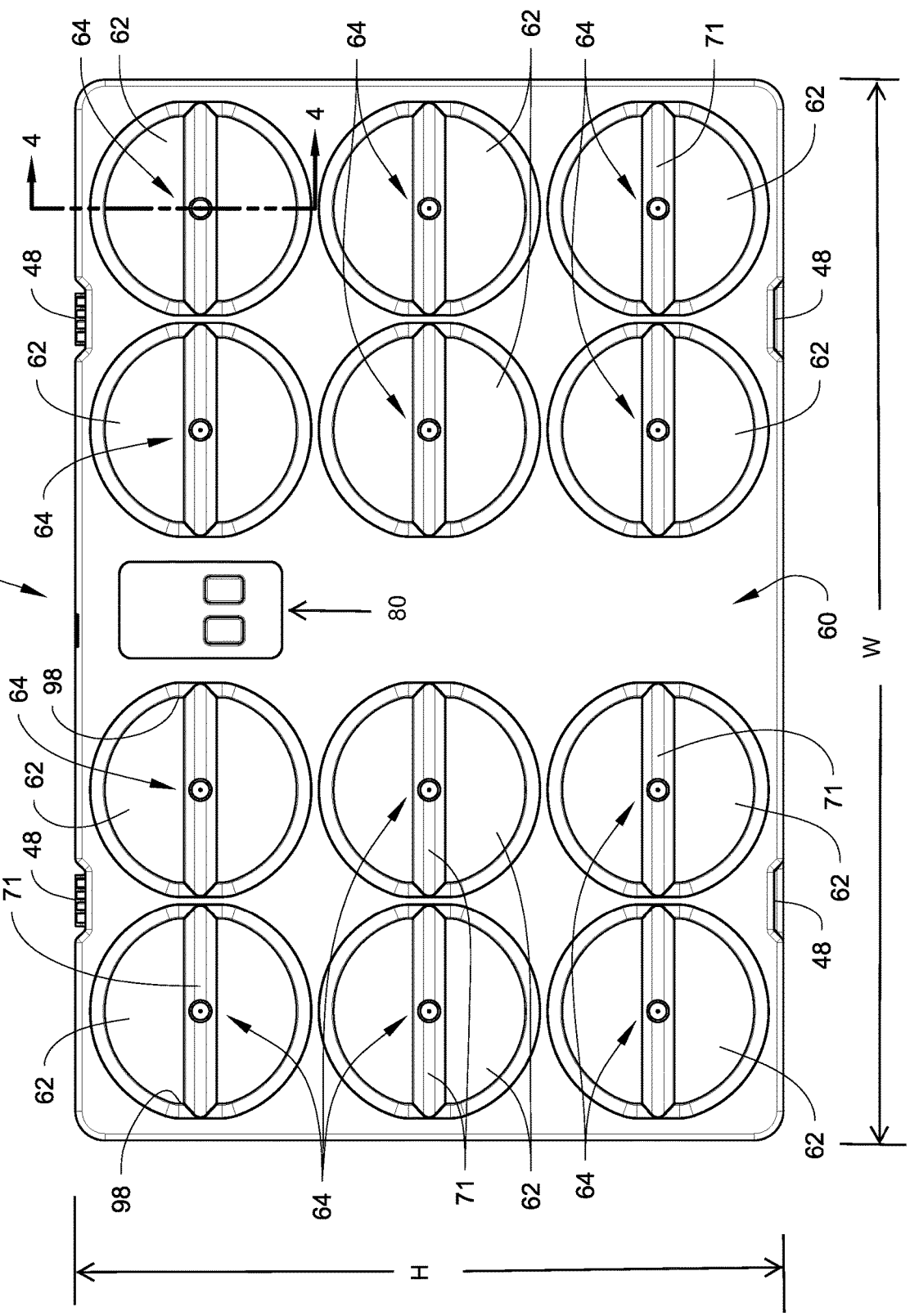

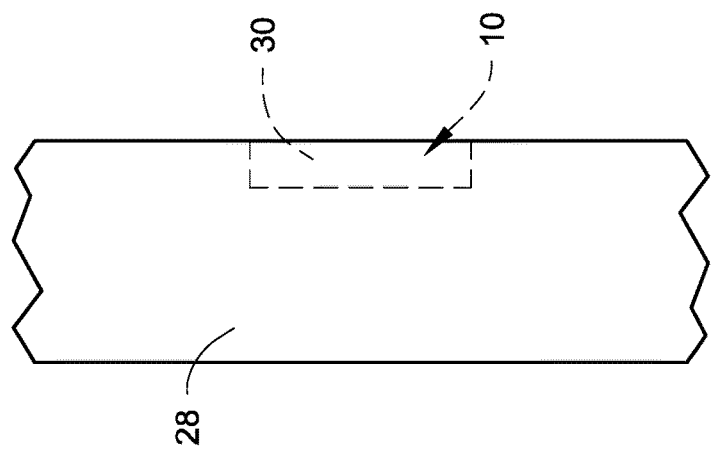
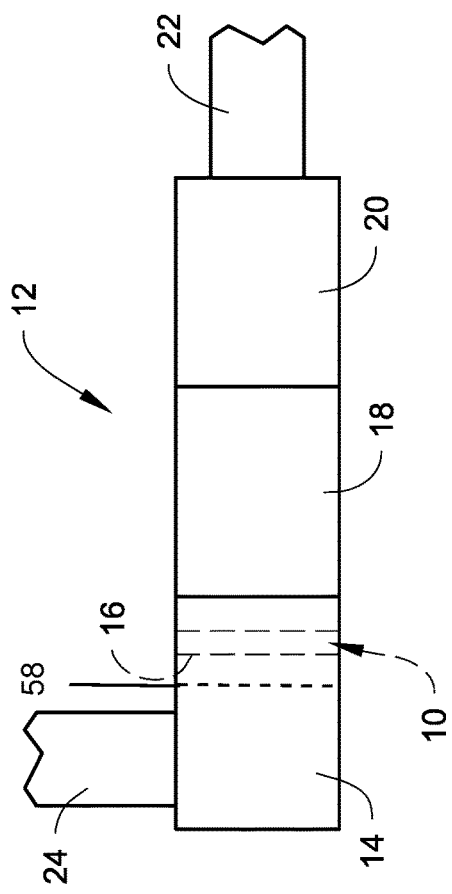
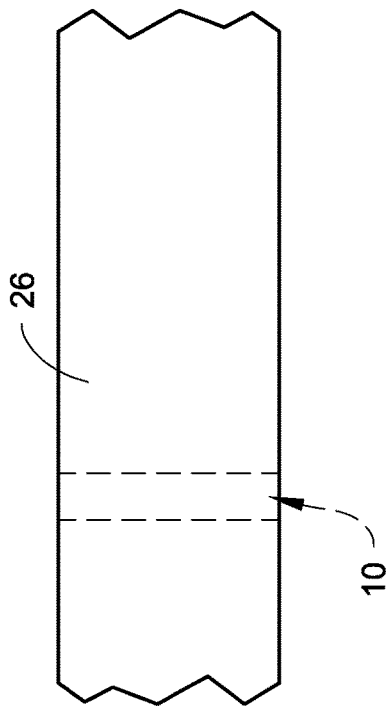

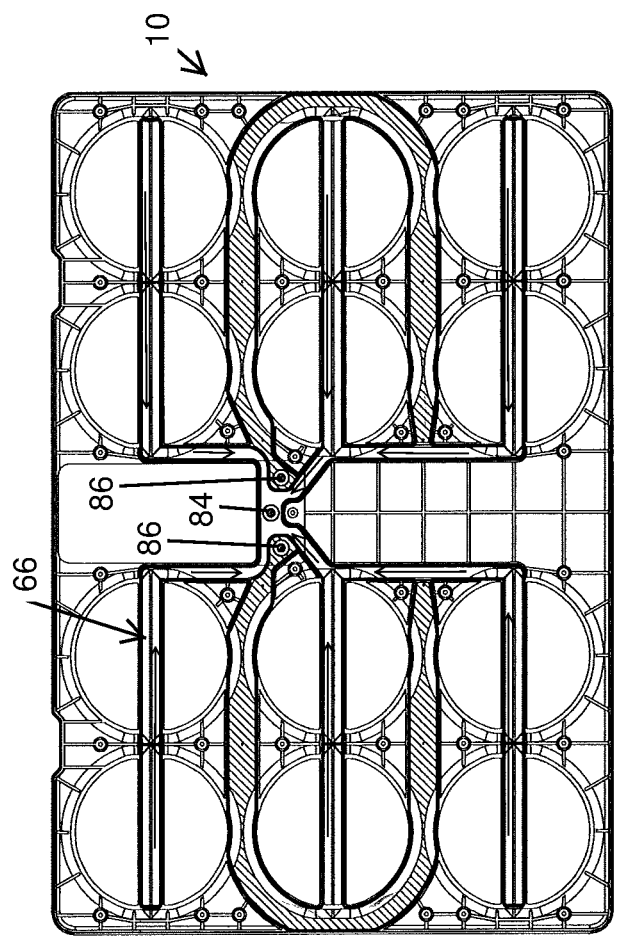

AIRFLOW MEASUREMENT DEVICE FOR AIRFLOW MEASURING

FIELD

This disclosure relates to an airflow measurement device, also referred to as a flow grid, that is used to measure airflow, for example in air handling equipment.

BACKGROUND

It is important for air handling systems, such as furnaces, heat pumps and air conditioners to have proper airflow to ensure efficient operation of the systems. For particular air handling systems, the airflow or air volume rates are required to be within specified airflow ranges. The flow of air is typically measured to ensure that the system was properly designed and installed and is operating according to specifications. For example, it is important to avoid low airflow in heat pumps, furnaces and air conditioners because reduced airflow results in performance inefficiency and can damage the compressor. Determining an unusually low or high airflow may indicate that a leak in the system or insufficient ventilation exists. An example of a known airflow measurement device for measuring airflow is disclosed in U.S. Pat. No. 6,439,061.

SUMMARY

Airflow measurement devices that are configured to measure airflow are described herein. The airflow measurement devices described herein may also be referred to as a flow grid, flow plate, or as an airflow measuring assembly. The airflow measurement devices can be used to measure airflow in any location where one may wish to measure airflow. An example location where the airflow measurement devices described herein can be used includes, but is not limited to, air handling equipment.

In one embodiment, the airflow measurement device is configured to be temporarily removably installed at a suitable location in the air handling equipment in order to conduct a test of the airflow. Once testing is completed, the airflow measurement device is removed from the air handling equipment. In another embodiment, the airflow measurement device can be configured to remain in place in the air handling equipment during regular intended use of the air handling equipment, although the airflow measurement device can be removable for replacement or the like.

In one embodiment described herein, the airflow measurement device can include a flow conditioning plate having a front plate portion and a rear plate portion. A plurality of plate apertures are formed in the front plate portion and the rear plate portion that permit the flow of air through the flow conditioning plate. A sensor bar is associated with each plate aperture for use in measuring airflow through the associated plate aperture. Each sensor bar extends at least partially across its associated plate aperture, and at least a portion of each sensor bar is integrally formed as a unitary, single-piece construction with the front plate portion or the rear plate portion.

Each sensor bar is part of an airflow sensor (for example in the case of a pitot sensor) or can have an airflow sensor mounted thereon (for example in the case of an anemometer). The airflow sensors can be any type(s) of airflow sensors that are suitable for sensing or characterizing one or more aspects of air flowing into and through the plate apertures. For example, the airflow sensors can be one or more of pitot sensors, or anemometers including, but not limited to, vane anemometers, hot wire anemometers, cup anemometers, vortex shedding anemometers, or the like. Readings from the airflow sensors can be used to quantify the volumetric airflow rate of the airflow, the speed of the airflow, or any other variable of the airflow from which one can formulate a judgment about the operating efficiency of the air handling equipment.

In another embodiment, the plate apertures of the flow conditioning plate are configured to condition the airflow while flowing into and through the plate apertures in order to minimize disruption of the airflow and improve the measurement accuracy of the airflow measurement device. For example, in one embodiment, the plate apertures can have beveled or tapered inlets and/or beveled or tapered outlets.

DRAWINGS

FIG. 3 is a front view of the airflow measurement device of FIGS. 1 and 2.

FIGS. 13-15 illustrate example mounting locations for the airflow measurement devices described herein in air handling equipment.

FIG. 16 illustrates flow paths of the total pressure airflows and the static pressure airflows through the total pressure flow channel and the static pressure flow channel, respectively.

DETAILED DESCRIPTION

Figure 1:
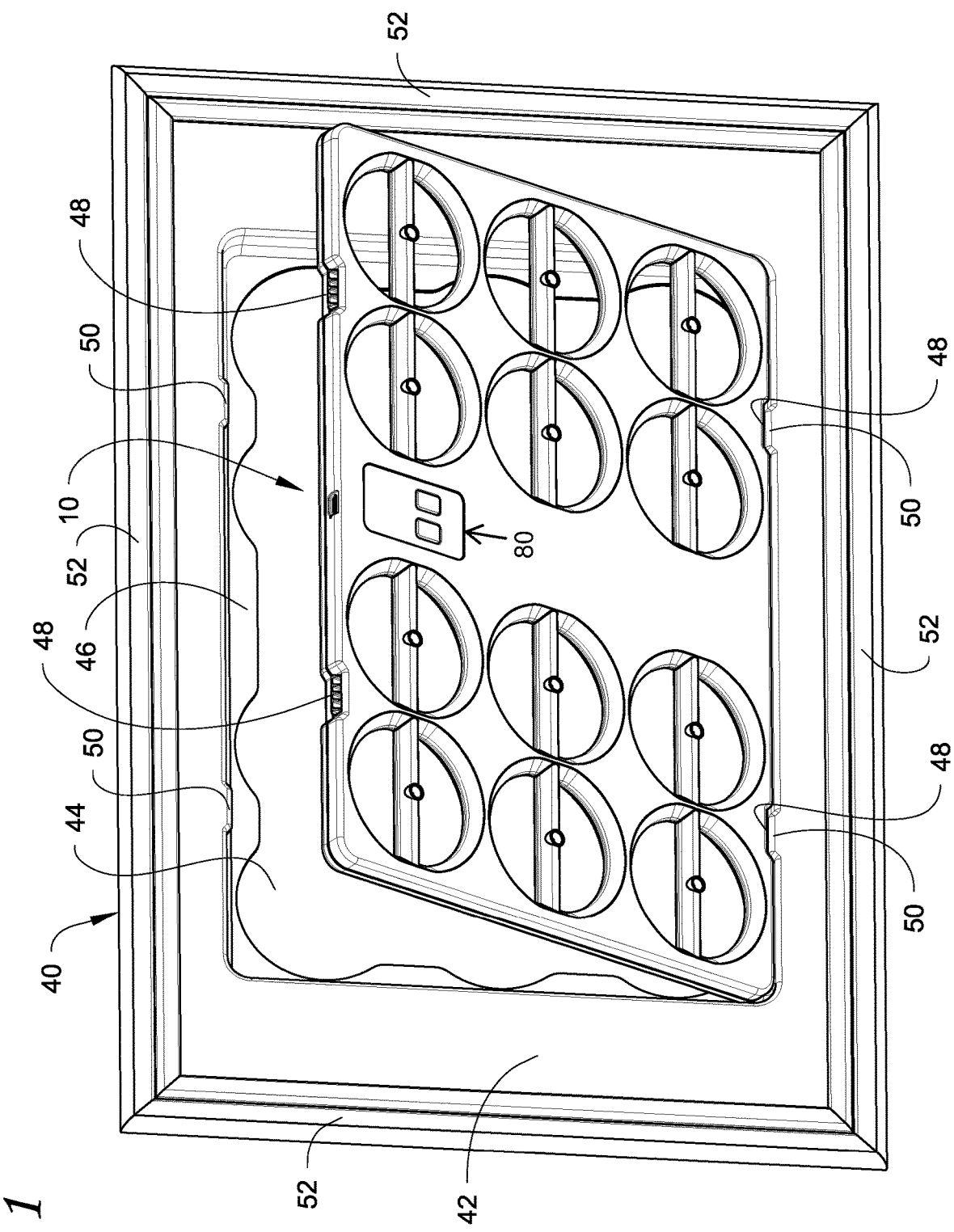
FIG. 1 illustrates an example of an airflow measurement device described herein partially installed in an optional one piece adapter.

An airflow measurement device 10 (also referred to as a flow grid, flow plate, flow meter, or an airflow measuring assembly) is described below that is configured to measure airflow. The airflow measurement device 10 can be used to measure airflow at any location where one may wish to measure airflow. In one embodiment described in further detail herein, the airflow measurement device 10 can be used to measure airflow in air handling equipment, for example in a component of a forced air distribution system, in an airflow duct, in a vent of an airflow duct from which air flows into a room or flows from a room into the duct. In another embodiment, the airflow measurement device 10 is not limited to use with air handling equipment, and can be used to measure airflow in any other environment where airflow is to be measured. In one embodiment, the air handling equipment can be residential air handling equipment installed in a residence.

FIGS. 13-15 illustrate example locations of use of the airflow measurement devices 10 described herein in air handling equipment. In particular, FIG. 13 schematically illustrates an example of air handling equipment 12 in the form of a furnace. In this example, the furnace is shown to include a return plenum 14, a filter slot 16, a blower 18, a supply plenum 20, a duct 22, and a return air duct 24. In normal use, the blower 18 is configured to pull cool air from the return plenum 14 through a filter (not shown) that is disposed in the filter slot 16. The output air exiting through the supply plenum 20 is conditioned (heated, cooled or filtered) by a heat exchanger or the like and pushed by the blower 18 through the supply plenum 20 and into the duct 22 to vents (not shown). The return air is pulled by the blower 18, which enters the furnace 12 through the return air duct 24, and flows into the return plenum 14 and through the filter disposed in the filter slot 16. In the embodiment in FIG. 13, the airflow measurement device 10 is intended to be positioned and used in the filter slot 16 by removing the filter from the filter slot 16 and inserting the airflow measurement device 10 in place of the filter. In other embodiments, the airflow measurement device 10 could be used in the return plenum 14, in the supply plenum 20, in the duct 22, or in the return air duct 24.

In the embodiment in FIG. 13, the airflow measurement device 10 is configured to mimic the filter normally used in the filter slot 16 whereby the airflow measurement device 10 is configured so that the pressure drop across the airflow measurement device 10 is substantially equal to the pressure drop that would be present across the filter when the filter is present. In this manner, disruption of the airflow is minimized, and the furnace experiences substantially the same airflow when the airflow measurement device 10 is present as when the filter is present.

FIG. 14 schematically illustrates another example of air handling equipment in the form of a duct 26, with the airflow measurement device 10 positioned in the duct 26 across the cross-sectional area thereof. The duct 26 can be any duct location of the air handling equipment provided with a location suitable for inserting and removing the airflow measurement device 10 therefrom.

FIG. 15 schematically illustrates another example of air handling equipment in the form of a duct 28 with a vent 30 through which air flows from the duct 28 into a room or into the duct 28 from a room. In one embodiment, one or more filters (not shown) may be disposed behind the vent 30 for filtering the airflow. In another embodiment, no filter is intended to be disposed behind the vent 30. In either event, the airflow measurement device 10 is intended to be positioned behind the vent 30 across the cross-sectional area thereof, for example in place of the filter(s) if present.

Hereinafter, for the purpose of describing the inventive concepts, this description will describe the airflow measurement device 10 as being configured for use in the filter slot 16 of the furnace of FIG. 13. However, it is to be realized that the airflow measurement device 10 can be used in other locations both in and outside of air handling equipment.

Figure 2:
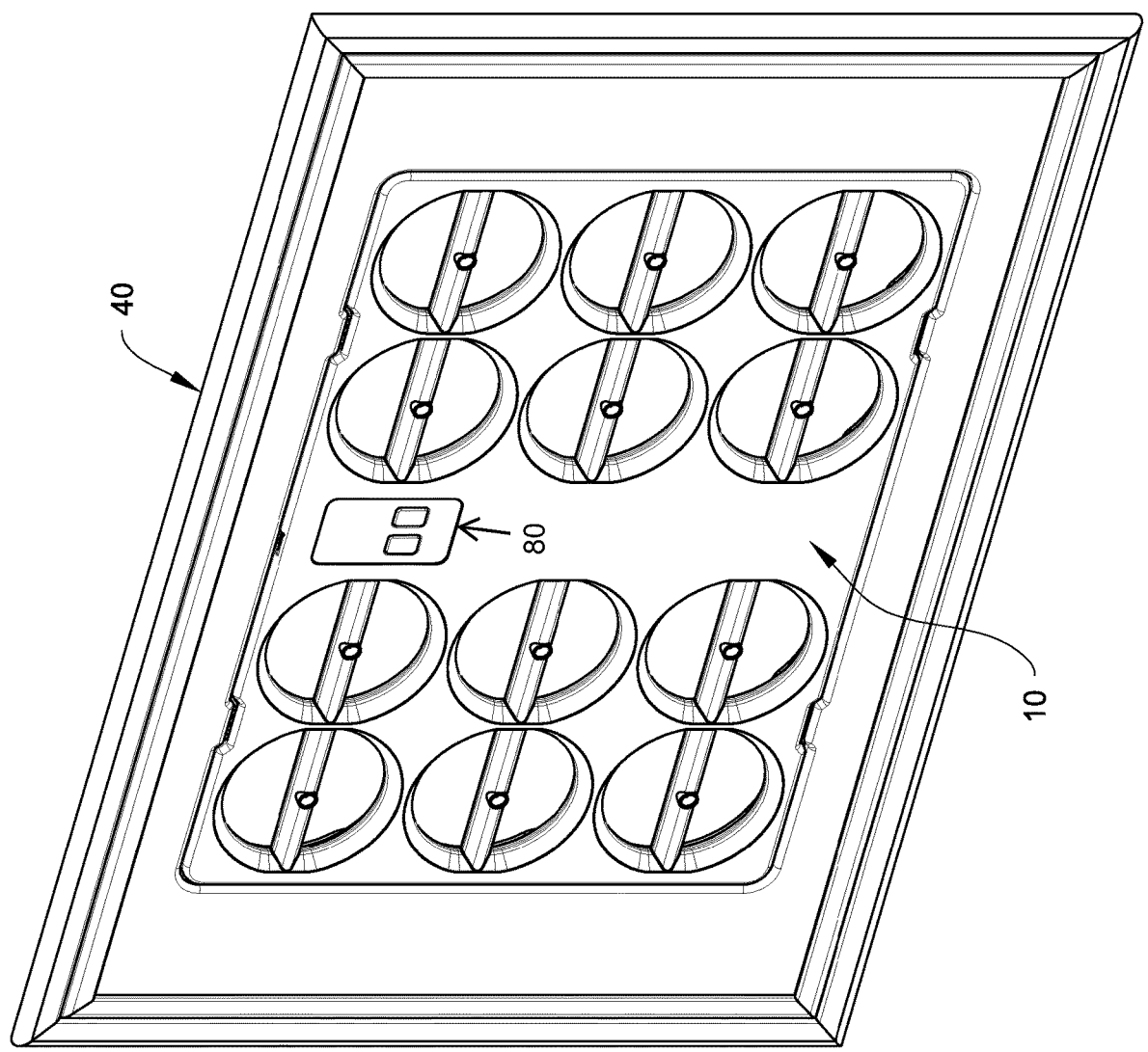
FIG. 2 illustrates the airflow measurement device of FIG. 1 fully installed in the optional one piece adapter.

With reference to FIGS. 1 and 2, the airflow measurement device 10 is illustrated relative to an optional one piece, fixed-size adapter or spacer 40. The adapter 40 is configured to facilitate mounting of the airflow measurement device 10 in the filter slot 16 so that the airflow measurement device 10 is always centered in the flow path. The adapter 40 can be made in different sizes to permit the airflow measurement device 10 to be mounted into different size filter slots 16. Thus, by changing the perimeter size of the adapter 40, a single size airflow measurement device 10 can be utilized. Alternatively, different sizes and configurations of the airflow measurement device 10 can be manufactured for use with different sizes and configurations of the filter slots 16, thereby eliminating the need for the adapter 40.

With continued reference to FIGS. 1 and 2, the adapter 40 comprises a central plate 42 with an airflow measurement device mount including a mounting hole 44 for removably receiving the airflow measurement device 10. The plate 42 includes a flange 46 that surrounds the hole 44 at the rear side thereof. When the airflow measurement device 10 is installed in the mount, the rear of the airflow measurement device 10 abuts against the flange 46 which acts as a stop for the airflow measurement device 10. A suitable retention mechanism can be provided for removably retaining the airflow measurement device 10 in the installed position on the adapter 40 as shown in FIG. 2. Any form of retention mechanism can be used, such as, but not limited to, one or more clasps, one or more snaps, one or more latches, hook and loop fasteners, mechanical fasteners such as one or more screws. For example, the airflow measurement device 10 can be provided with one or more fasteners 48 on the perimeter thereof that are engageable with corresponding detents 50 on the central plate 42 for removably securing the airflow measurement device 10 on the adapter 40. The fasteners 48 of the airflow measurement device 10 can be spring loaded latches that can fit into the detents 50 of the adapter 40. The fasteners 48 and the detents 50 are sufficient for maintaining the airflow measurement device 10 in the installed position during use of the airflow measurement device 10 in the air handling equipment, but permit manual removal of the airflow measurement device 10 from the adapter 40 without requiring the use of mechanical removal tools such as a screwdriver. To install the airflow measurement device 10 on the adapter 40, the airflow measurement device 10 is brought into engagement with the adapter 40 as shown in FIG. 1, with the lower fasteners 48 and the lower detents 50 engaged with one another. The airflow measurement device 10 is then tilted upward until the upper fasteners 48 and the upper detents 50 are engaged as shown in FIG. 2, thereby retaining the airflow measurement device 10 on the adapter 40.

Still referring to FIGS. 1 and 2, the entire perimeter edge of the plate 42 is provided with a gasket or seal 52 that can extend generally radially from the plate 42. The gasket 52 can be formed of any flexible, resilient material that permits the gasket 52 to engage with the structure of the air handling equipment when the adapter 40 is mounted in the filter slot to prevent air leakage from the air handling equipment. Examples of suitable material for the gasket 52 include, but are not limited to, rubber, foam, plastic, and the like.

When the adapter 40 and the installed airflow measurement device 10 are installed in the filter slot, the entire cross-sectional area of the flow path is occupied, with the gasket 52 sealing with the air handling equipment. In addition, the entire plate 42 between the mounting hole 44 and the gasket 52 is solid and devoid of air passages. Therefore, substantially all of the airflow is required to flow through the airflow measurement device 10.

In other embodiments, instead of using the adapter 40, the airflow measurement device 10 can be used without the adapter 40. In such a case, the airflow measurement device 10 can be provided with a perimeter gasket, similar to the gasket 52, which seals with the air handling equipment when the airflow measurement device 10 is installed in the filter slot 16 so that substantially all of the airflow flows through the airflow measurement device 10.

In some embodiments, a flow conditioning device 58 (see FIG. 13) can be disposed upstream of the airflow measurement device 10 to condition the flow prior to reaching the airflow measurement device 10. For example, the flow conditioning device 58 can be a screen or other structure that straightens or smooths the airflow (for example, eliminating turbulence and generating substantially laminar flow) prior to reaching the airflow measurement device 10. In other embodiments, the flow conditioning device 58 could be configured to introduce turbulence into the airflow prior to reaching the airflow measurement device 10. The flow conditioning device 58, if present, can be configured to help generate any airflow conditions one may wish the airflow measurement device 10 to encounter.

Turning now to FIG. 3, details of the airflow measurement device 10 will now be described. The airflow measurement device 10 includes a flow conditioning plate 60 that is formed with a plurality of plate apertures or holes 62 therethrough that permit the flow of air through the device 10. The illustrated example depicts twelve of the plate apertures 62 arranged in four vertical columns and three horizontal rows. However, any number of the plate apertures 62 can be used, and the plate apertures 62 need not be arranged into vertical columns and horizontal rows. Instead, the plate apertures 62 can be disposed in a staggered arrangement, be randomly arranged, or disposed in any other arrangement. In addition, the flow conditioning plate 60 can be any structure and can have any configuration in which apertures allowing airflow therethrough can be formed. The flow conditioning plate 60 can be flat or curved. The flow conditioning plate 60 can have a configuration as illustrated or the flow conditioning plate 60 can be configured as a screen, with holes in the screen forming the plate apertures 62. So an airflow measurement device encompasses any structure with a plurality of airflow apertures or holes that permit the flow of air therethrough used to sense airflow as described herein.

In addition, at least one flow sensor 64 is associated with each one of the apertures 62 thereby forming an array of the flow sensors 64 on the device 10. The flow sensors 64 can be any type(s) of flow sensors that are suitable for sensing or characterizing one or more aspects of air flowing into and through the apertures 62. For example, the flow sensors 64 can be one or more of pitot sensors, or anemometers such as vane anemometers, hot wire anemometers, vortex shedding anemometers or the like. Further information on these types of sensors can be found in U.S. Pat. No. 6,439,061 the entire contents of which are incorporated herein by reference. The flow sensors 64 can be used to quantify the volumetric airflow rate of the airflow, the speed of the airflow, or any other variable of the airflow from which one can formulate a judgment about the operating efficiency of the air handling equipment that the airflow measurement device 10 is installed in. In one embodiment, the flow sensors 64 are integrally formed with the flow conditioning plate 60 so as to form a unitary, single piece construction therewith.

Figure 4:
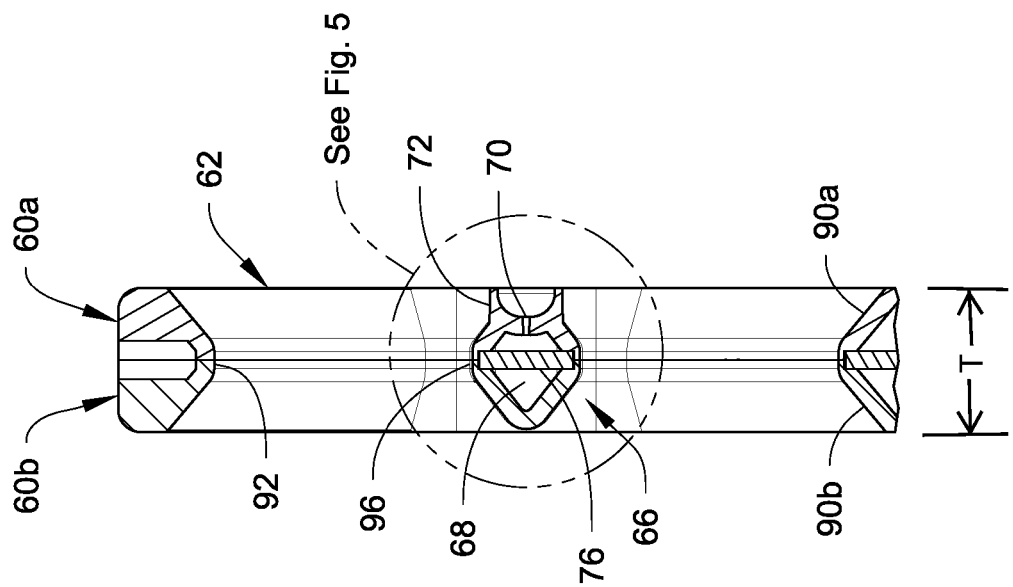
FIG. 4 is a cross-sectional view through one of the plate apertures taken along line 4-4 of FIG. 3.
Figure 6:
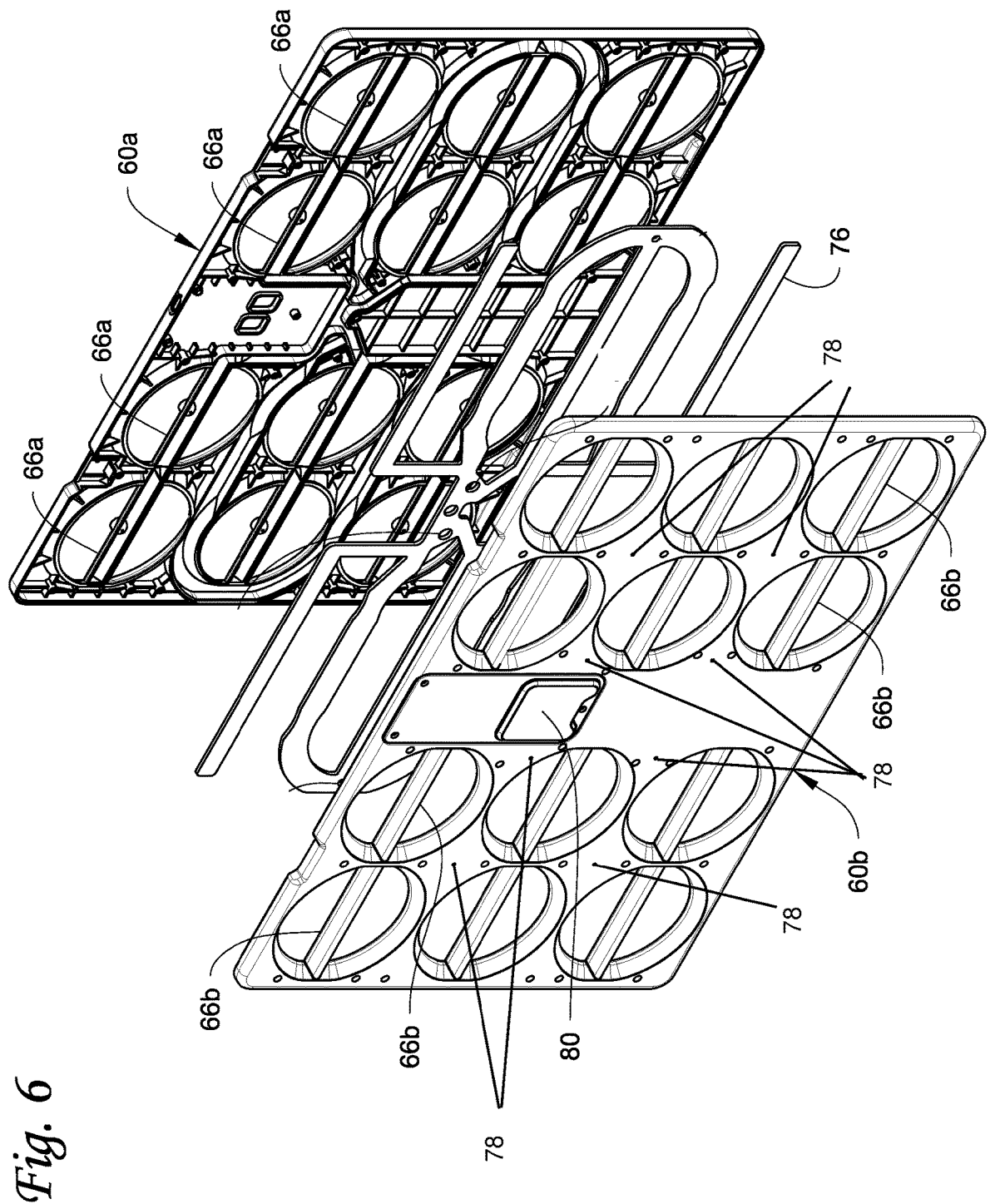
FIG. 6 is an exploded view of one embodiment of the airflow measurement device with front and rear plate portions and a gasket between the front and rear plate portions.

As best seen in FIGS. 4 and 6, in one embodiment the plate 60 can be formed by a front plate portion 60a and a rear plate portion 60b that mates with the front plate portion 60a. The plate portions 60a, 60b can be removably secured to one another in a manner to permit the plate portions 60a, 60b to be separated after they are secured together. In another embodiment, the plate portions 60a, 60b can be permanently secured together whereby the plate portions 60a, 60b are not intended to be separated. In still another embodiment, the plate 60 can be formed by a single piece structure, for example by an additive manufacturing process (often termed 3D printing) or by blow molding, that combines the features and configuration of the plate portions 60a, 60b.

Referring to FIGS. 3-6, in the illustrated example, all of the flow sensors 64 are the same. Each flow sensor 64 includes a sensor bar 66 that extends diametrically across the apertures 62. At least a portion of each sensor bar 66 is integrally formed as a unitary, single-piece construction with the plate 60. The sensor bars 66 can extend across any diameter of the apertures 62. In the illustrated example, the sensor bars 66 extend horizontally across each aperture 62. As discussed in further detail below, each sensor bar 66 defines one or more fluid flow channels or manifolds 68. The sensor bars 66 need not extend entirely across the entire diameter of its respective aperture 62. For example, referring to the example in FIG. 9, the sensor bars 66 extend only partially across the diameter of each aperture 62.

As best seen in FIGS. 4-6, each sensor bar 66 can be formed by a front sensor bar portion 66a of the front plate portion 60a and a rear sensor bar portion 66b of the rear plate portion 60b that mates with the front sensor bar portion 66a. The front sensor bar portion 66a is integrally formed as a unitary, single-piece construction with the front plate portion 60a and the rear sensor bar portion 66b is integrally formed as a unitary, single-piece construction with the with the rear plate portion 60b. The mated sensor bar portions 66a, 66b form the flow channel 68. In addition, in some embodiments, a gasket 76 can be provided between the front plate portion 60a and the rear plate portion 60b including between the front sensor bar portion 66a and the rear sensor bar portion 66b. In other embodiments, the gasket 76 is not used. The gasket 76 (if present) divides the flow channel 68 into a front channel portion 68a (or total pressure flow channel 68a) for use in measuring total pressure and a rear channel portion 68b (or static pressure flow channel 68b) for use in measuring static pressure.

Each sensor bar 66 includes a total pressure port 70 formed therein and facing in a direction toward a front of the flow conditioning plate 60. Each total pressure port 70 is fluidly connected to the total pressure flow channel 68a. As best seen in FIGS. 3-6, the total pressure port 70 is formed in a leading edge 71 of each front sensor bar portion 66a, for example at the center thereof, that permits air to flow into the total pressure port 70 and then into the total pressure flow channel 68a. In addition, a flow guide 72 surrounds each pressure port 70 and extends in a forward direction beyond the associated total pressure port 70. The configuration of the flow guide 72 helps to guide air into the total pressure port 70 while being generally immune to the angle of the airflow and minimizing disruption of the airflow through the plate aperture 62. The flow guides 72 help to increase the accuracy of the total pressure reading obtained by the airflow measurement device 10.

Figure 5A:
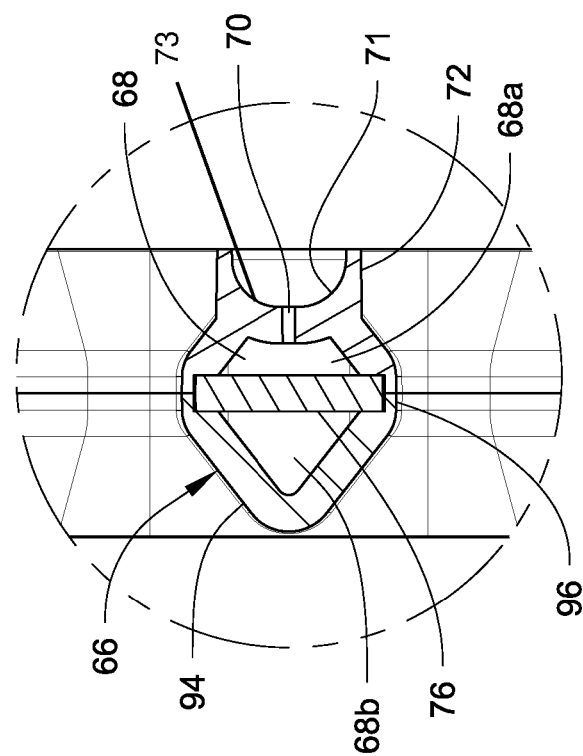
FIG. 5A is a close-up view of the area contained in circle 5 of FIG. 4.

As best seen in FIG. 5A, the flow guide 72 extends forwardly from the front sensor bar portion 66a so that the flow guide 72 projects forwardly beyond the total pressure port 70. The flow guide 72 can have any configuration that is suitable for guiding airflow into the associated total pressure port 70. For example, with reference to FIG. 3, the flow guide 72 can be circular in a front view of the airflow measurement device 10. However, shapes other than circular in a front view, such as rectangular, oval shaped, or the like can be used. With reference to FIG. 5A, in one embodiment the flow guide 72 can be generally cup-shaped with a curved side wall 73 leading to the port 70. In another embodiment illustrated in FIG. 5B, the side wall 73 of the flow guide 72 can be substantially flat and can taper toward the associated port 70. Many other configurations of the side wall 73 are possible in order to achieve the guiding of the air to the port 70 as described herein.

Referring to FIG. 6, the airflow measurement device 10 further includes a plurality of static pressure ports 78 integrally formed in the rear plate portion 60b. The example in FIG. 6 illustrates eight of the static pressure ports 78 although a larger or smaller number of the ports 78 can be used. Each static pressure port 78 extends through the rear plate portion 60b and is fluidly connected to the static pressure flow channel 68b for use in measuring the static pressure across the airflow measurement device 10.

Figure 17B:
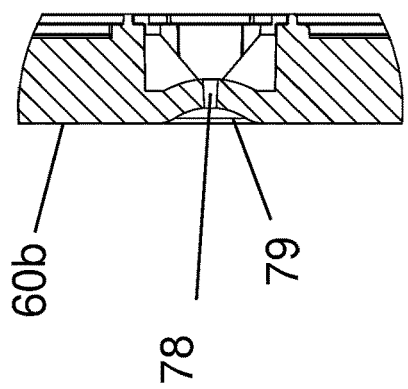
FIGS. 17A and 17B illustrate another example of an airflow measurement device with FIG. 17A being a rear perspective view and FIG. 17B being a cross-sectional view at the area contained in the circle A in FIG. 17A.
Figure 17A:
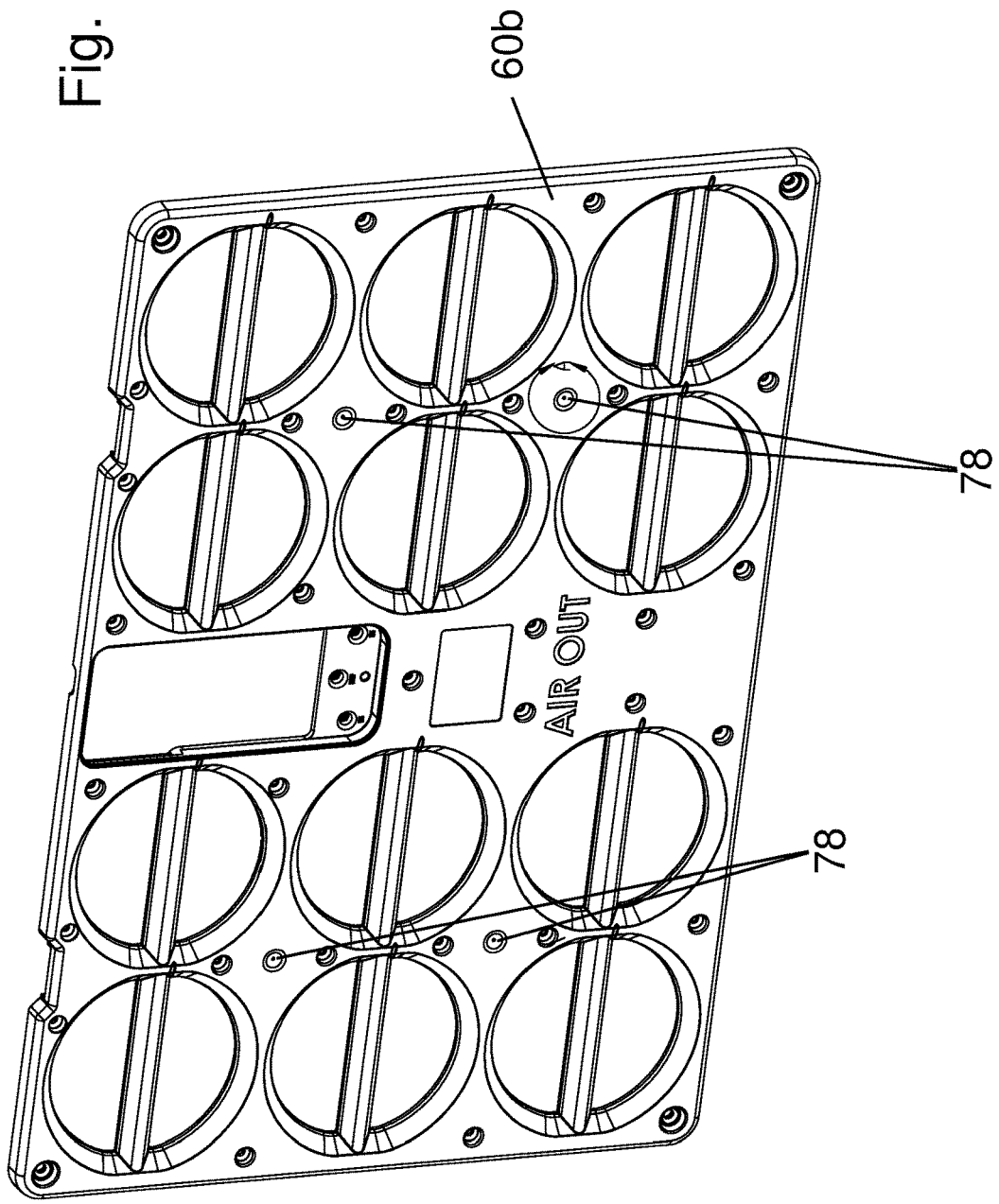

The ports 78 can be simple openings in the rear plate portion 60b as depicted in FIG. 6. Alternatively, as illustrated in FIGS. 17A and 17B, each one of the ports 78 can include a flow guide 79 surrounding the port 78. Each flow guide 79 can be formed by a cup that projects from the surface of the rear plate portion 60b or by recessing the port 78 (illustrated in FIG. 17B) into the rear plate portion 60b. Each flow guide 79 extends in a forward direction beyond its associated port 78 to help guide air into the associated port 78 while being generally immune to the angle of the airflow.

The flow conditioning plate 60 is further provided with a sensor assembly 80 that contains one or more sensors that are configured to sense the airflow variable(s) that the device 10 is configured to sense. For example, with reference to FIGS. 6, 7 and 16, the sensor assembly 80 can include a pressure sensor 82, for example a differential pressure sensor, that is in fluid communication with both the total pressure flow channel 68a and the static pressure flow channel 68b. Many suitable differential pressure sensors can be used. One non-limiting example of a suitable differential pressure sensor that can be used is an SDP series differential pressure sensor available from Sensirion AG of Switzerland. The pressure sensor 82 determines the dynamic pressure across the airflow measurement device 10 based on the air pressures in the total pressure flow channel 68a and the static pressure flow channel 68b.

FIG. 16 illustrates the communications between the various total pressure flow channels 68a (not hatched), which combine the airflows from the total pressure ports 70, and a total pressure tap 84 leading to the pressure sensor 82 (the airflow is indicated by arrows), and the communications between the static pressure flow channels 68b (hatched lines), which combine the airflows though the static pressure ports 78, and static pressure taps 86 leading to the pressure sensor 82.

Figure 7:
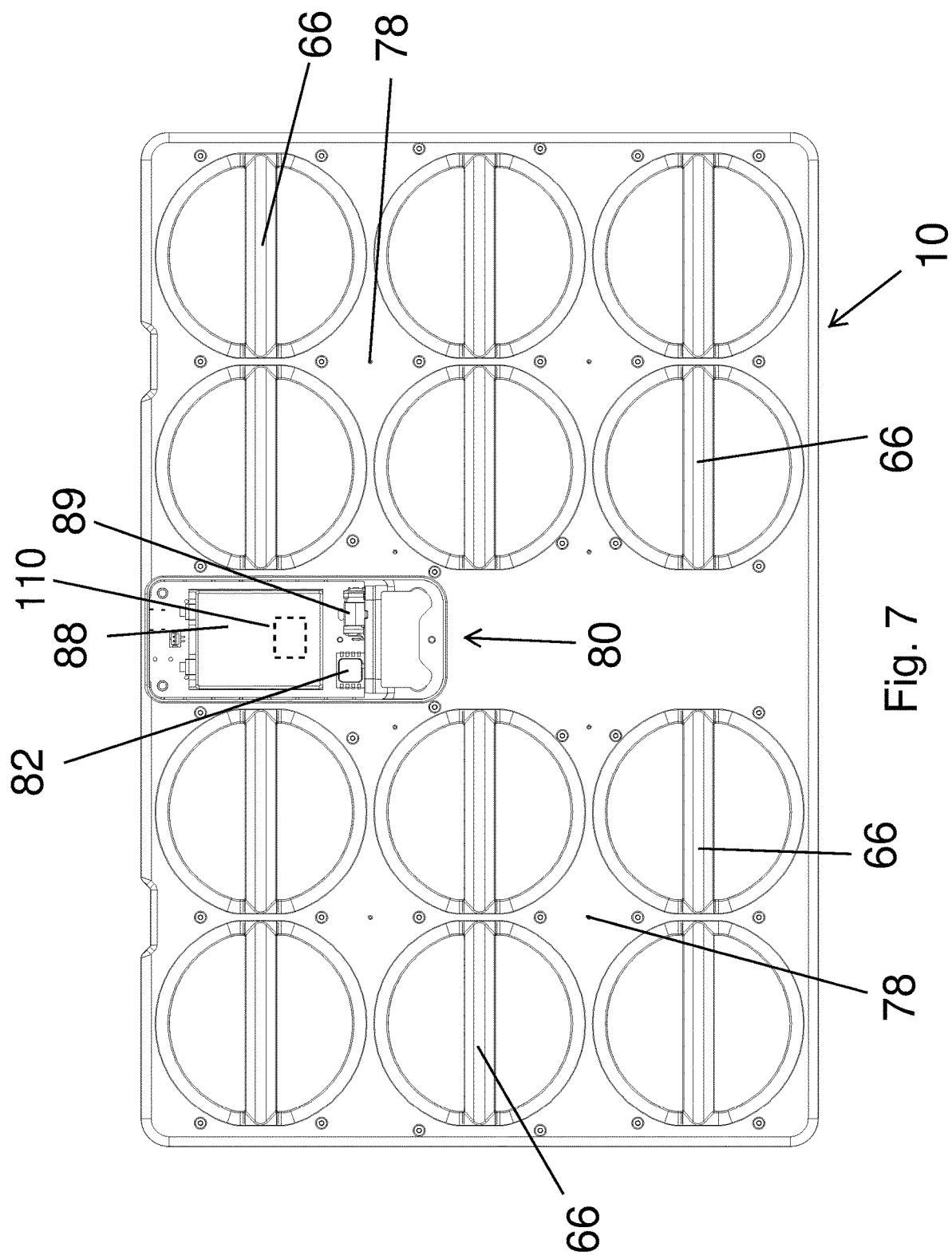
FIG. 7 illustrates details of the sensor assembly of the airflow measurement device.
Figure 8:
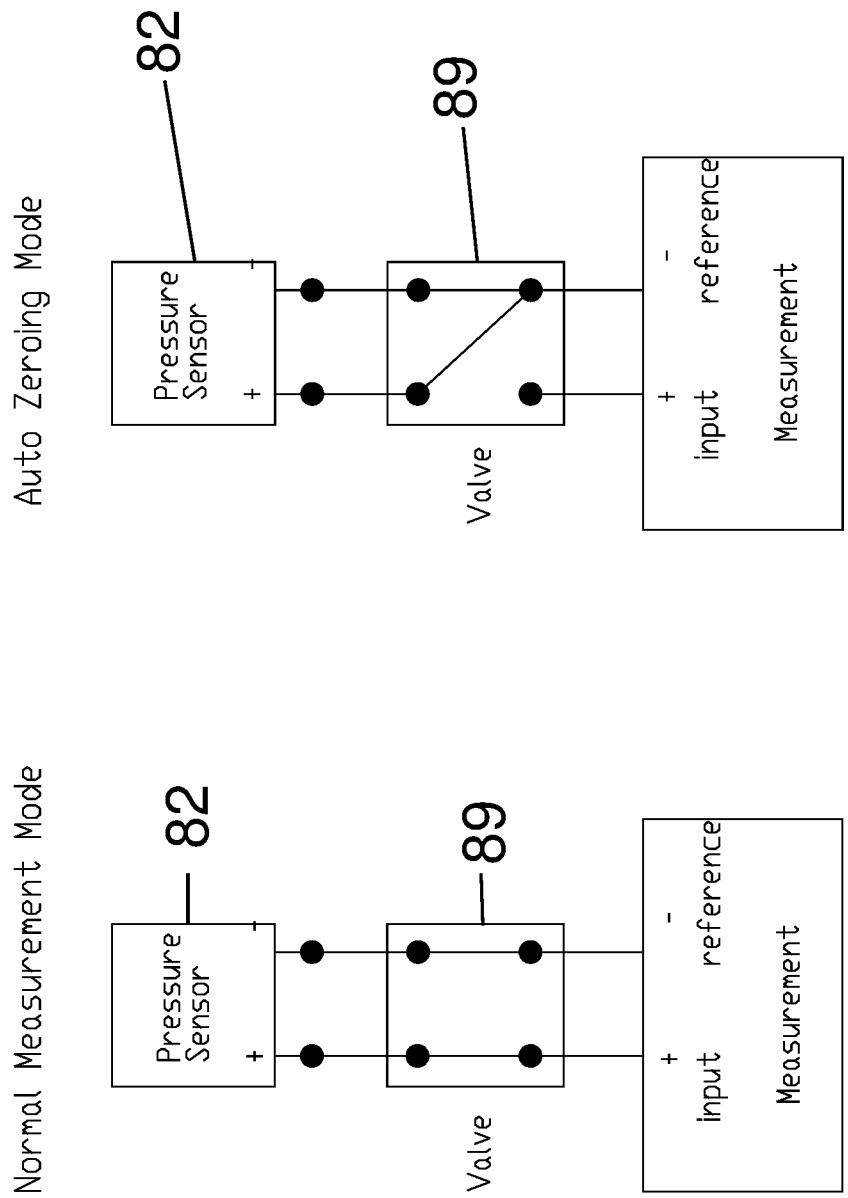
FIGS. 8A and 8B illustrate an auto-zeroing function of the sensor assembly.

FIG. 7 further illustrates the sensor assembly 80 as including an on board electronics package 88 that receives data from the pressure sensor 82 and that is configured to perform data calculations, such as determining the dynamic pressure, and communicating data externally of the airflow measurement device 10, such as wirelessly transmitting the determined dynamic pressure externally, for example to the cloud or other remote server or other location, using a suitable wireless communication device such as a transmitter (which could also include the ability to receive transmitted signals) or a transceiver. In addition, the sensor assembly 80 includes a valve 89, such as a solenoid valve, between the pressure taps 84, 86 and the sensor 82. With reference to FIGS. 8A and 8B, the valve 89 can be used in an auto-zeroing procedure whereby the valve 89 is used to temporarily connect the taps 84, 86 together to place equal pressure on each side of the pressure sensor 82 (FIG. 8B). The zero offset of the sensor 82 is then corrected/adjusted (similar to tare when zeroing a scale). Once zeroed, the valve 89 then changes back to normal measurement mode (FIG. 8A). By performing auto zeroing, the uncertainty of changing variables such as temperature or position of the airflow measurement device 10 on the sensor reading is removed, thereby providing more accurate measurements.

In an embodiment, with reference to FIG. 7, an accelerometer 110 can be provided on the device 10 to determine the orientation of the device 10. The accelerometer 110 can be a 1-axis, 2-axis or 3-axis accelerometer. The accelerometer 110 can be located at any suitable location on the device 10, for example included on the electronics package 88. Data from a reading of the accelerometer 110 may be transmitted externally of the device 10, for example by wireless transmission, to the cloud or other remote server or other location.

Figure 5B:
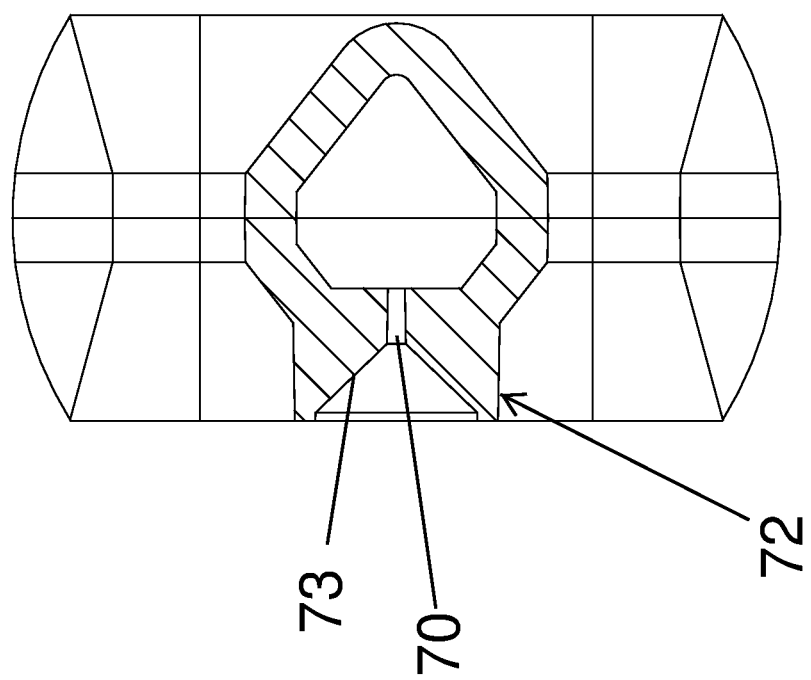
FIG. 5B is a close-up view similar to FIG. 5A of another embodiment.

Referring to FIGS. 4, 5A, and 5B, the plate apertures 62 and the sensor bars 66 are configured to smoothly guide the airflow through the airflow measurement device 10 in order to minimize disruption of the airflow and improve the measurement accuracy of the device 10. For example, the plate apertures 62 can each have a beveled or sloped inlet surface 90a, for example formed on the front plate portion 60a, and a beveled or sloped outlet surface 90b, for example formed on the rear plate portion 60b. The beveled inlet surface 90a is illustrated as intersecting a front surface of the flow conditioning plate and slopes continuously therefrom. The beveled outlet surface 90b is illustrated as intersecting a rear surface of the flow conditioning plate and slopes continuously therefrom. A surface 92 at an intersection between the beveled inlet surface 90a and the beveled outlet surface 90b can be linear and substantially parallel to a central axis of the aperture 62 or parallel to the pressure port 70. In some embodiments, the inlet surface 90a and/or the outlet surface 90b need not be tapered, and either one or both can be flat or parallel to the surface 92 or substantially parallel to a central axis of the aperture 62 or parallel to the pressure port 70.

In addition, the leading edge 71 of each sensor bar 66, for example the leading edge of the front sensor bar portion 66a, can be flat at locations outside the flow guides 72 (see FIG. 3). Further, a trailing edge 94 of each sensor bar 66, for example the rear edge of the rear sensor bar portion 66b, tapers downwardly from a linear surface 96, at an intersection between the front sensor bar portion 66a and the rear sensor bar portion 66b, that is substantially parallel to a central axis of the plate aperture 62, or parallel to the pressure port 70, or parallel to the surface 92.

Figure 9:
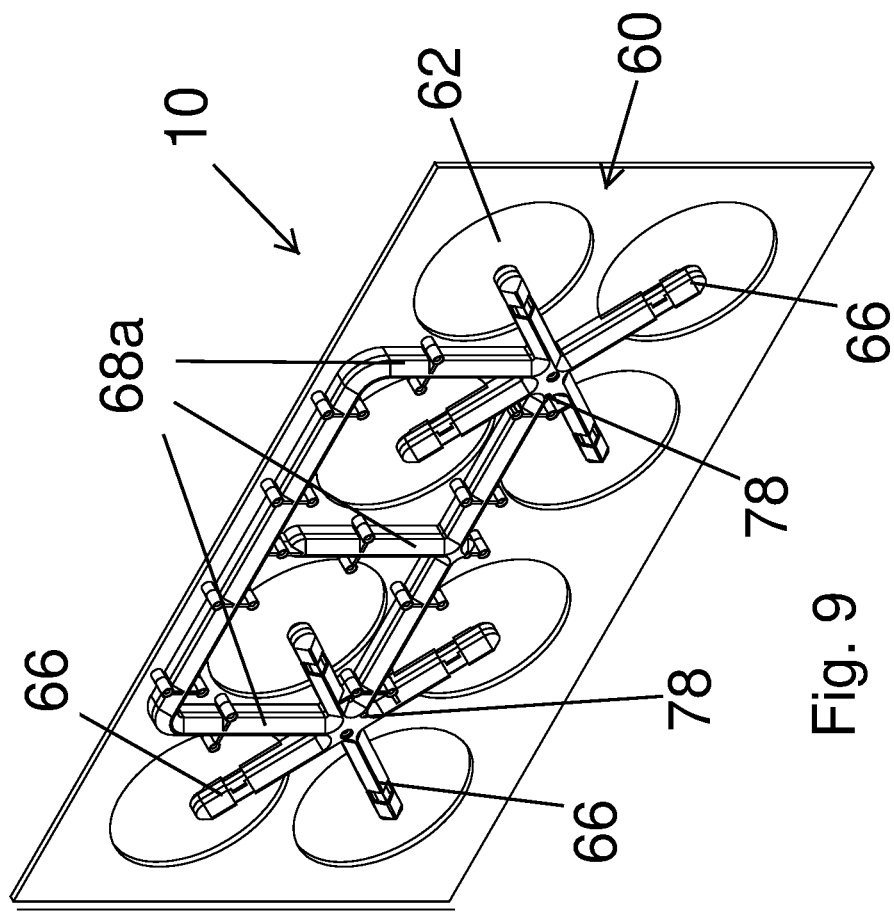
FIG. 9 illustrates another example of an airflow measurement device described herein.
Figure 10:
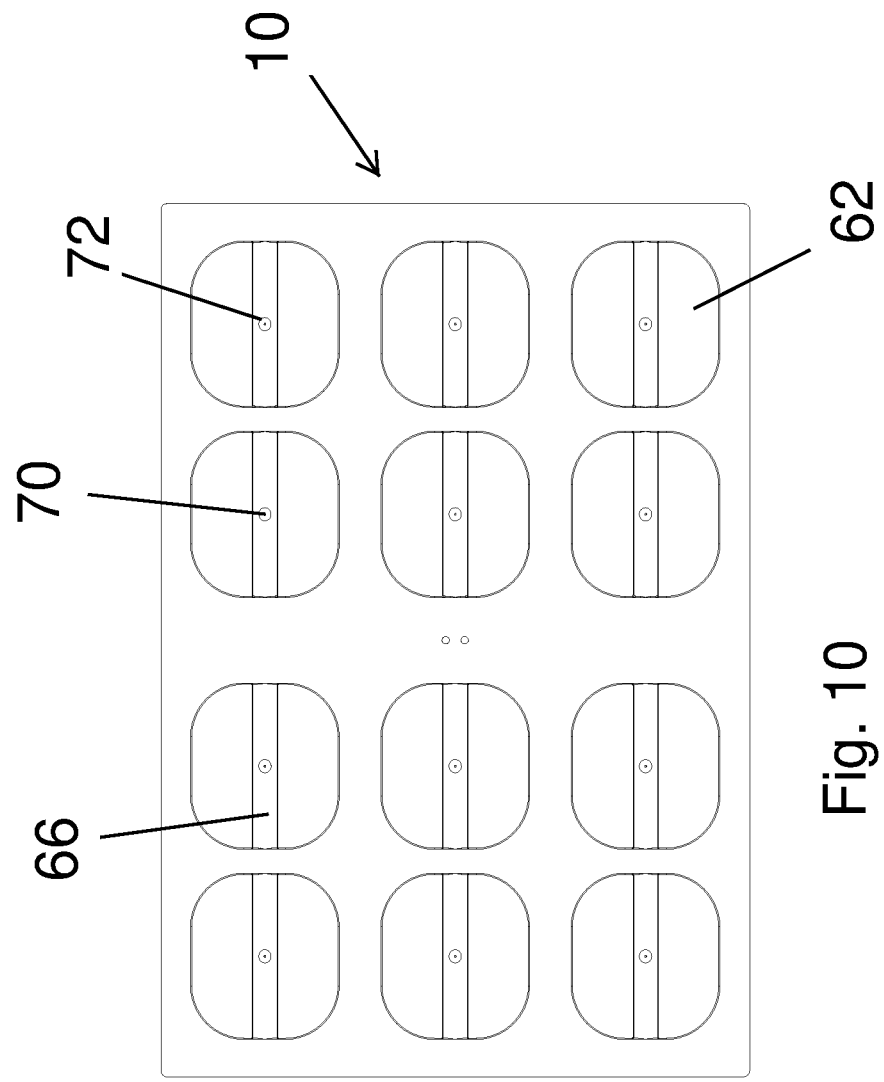
FIGS. 10-12 illustrate additional examples of shapes of the plate apertures that can be used.
Figure 11:
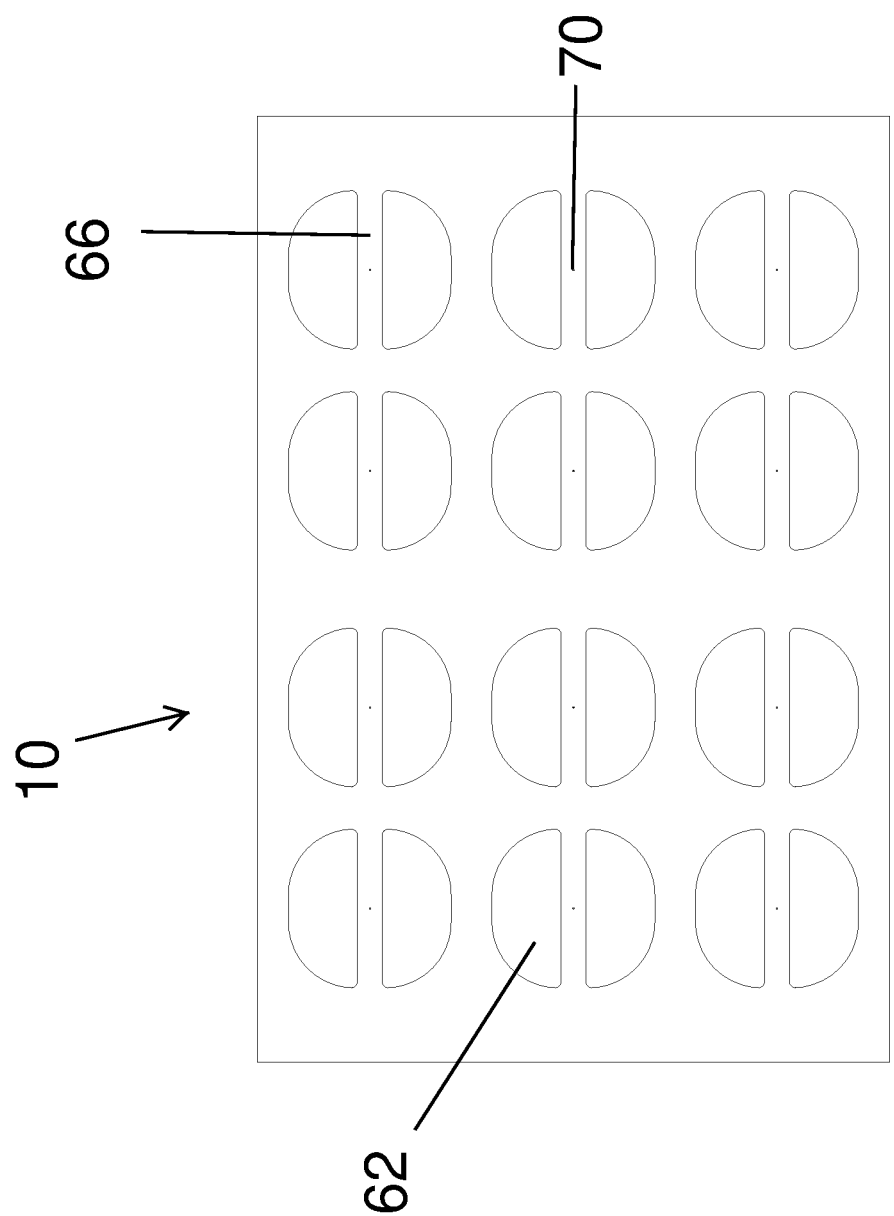
Figure 12:
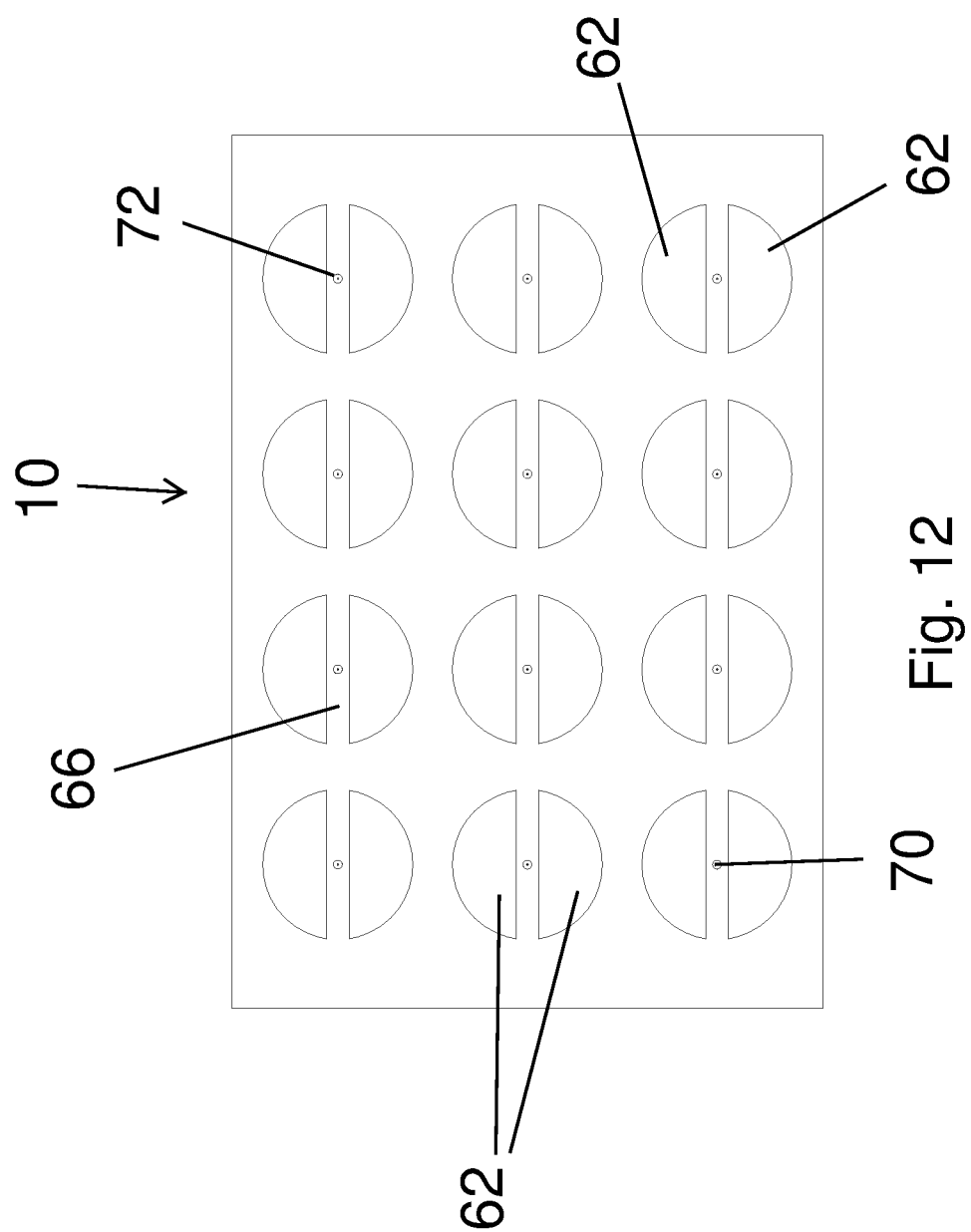

Further, with reference to FIGS. 1-3, each plate aperture 62 is illustrated as being substantially circular. However, where the ends of the sensor bars 66 connect to the flow conditioning plate 60, the apertures 62 have linear sections 98. However, other shapes for the plate apertures 62 are possible. For example, FIG. 9 illustrates the plate apertures 62 that are completely circular; FIG. 10 illustrates the plate apertures 62 as being generally rectangular or rectangles with rounded corners; FIG. 11 illustrates the plate apertures 62 as being generally semi-circular on each side of the sensor bar 66 with flat portions 100 at the top and bottom; FIG. 12 illustrates the plate apertures 62 as being semi-circular on each side of the sensor bar 66. Many other shapes of the plate apertures 62 are possible.

Referring again to FIG. 9, in one embodiment the flow conditioning plate 60 can be a flat plate without front and rear plate portions. In this embodiment, the total pressure flow channel/plenum 68a can be formed by tubes mounted on the back side of the plate 60, with total pressure ports (which can be similar to the total pressure ports 70 or different) on each one of the sensor bars 66 facing forwardly. The static pressure ports 78 are formed at suitable locations which are in fluid communication with a static pressure flow channel/plenum 68b that is separated from the total pressure flow channel/plenum 68a. The total pressure flow channel/plenum 68a and the static pressure flow channel/plenum 68b can be in fluid communication with a sensor on a sensor assembly as described above.

With respect to the embodiments in FIGS. 10-12, the airflow measurement devices 10 illustrated therein can be similar to the construction of the airflow measurement device 10 described with respect to FIGS. 1-7 except for the shape of the pater apertures 62 in front view. However, other variations are possible. For example, as depicted in FIG. 11, flow guides need not be disposed around the total pressure ports 70.

In some embodiments, air flow through the plate apertures 62 can be determined by sensing devices other than pitot sensors. For example, a hot wire anemometer can be disposed in each plate aperture 62 supported by the sensor bar 66. Each hot wire anemometer can include an electrically heated fine wire of a metal or other conducting material. The wire of the anemometer is exposed to the air traveling through each aperture 62. The airflow impacts the resistance of the wire, with changes in the airflow changing the resistance. In a constant-current anemometer, air velocity is determined by measuring the wire resistance whereas in a constant-resistance anemometer, air velocity is determined by measuring the current required to maintain the wire temperature, and thus the resistance constant. Either type of anemometer, which differ primarily in electric circuitry and instruments utilized, may be used. The resistance/current readings can be routed to a suitable sensor in the sensor assembly 80. Other types of anemometer structures, such as rotating vane, swinging vane, vortex shedding and the like, may also be utilized.

The flow conditioning plate 60, including the sensor bars 66, can be integrally formed from a suitable plastic material so they form an integrally formed, unitary, single-piece construction. Likewise, the plate portion 60a and the corresponding sensor bar portions 66a, and the plate portion 60b and the corresponding sensor bar portion 66b, can each be integrally formed from a suitable plastic material so they each form an integrally formed, unitary, single-piece construction.

As used herein, the term "plate" is intended to encompass plate-like structures that have width W and height H (i.e. vertical) dimensions (best seen in FIG. 3) that are much greater than a thickness T dimension thereof (best seen in FIG. 4). The plate can be substantially flat or the plate, or a portion of the plate, can be curved. The plate can be a structure like that illustrated in any one of FIGS. 1-3 and 9-12 or the plate can have a screen/mesh-like construction.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An airflow measurement device, comprising:
   a flow conditioning plate that includes a front plate portion and a rear plate portion;
   a plurality of plate apertures formed in the front plate portion and the rear plate portion that permit the flow of air through the flow conditioning plate; and
   a sensor bar associated with each plate aperture for use in measuring airflow through the associated plate aperture, each sensor bar extending at least partially across its associated plate aperture, and at least a portion of each sensor bar is integrally formed as a unitary, single-piece construction with the front plate portion or the rear plate portion.

2. The airflow measurement device of claim 1, wherein each sensor bar comprises a front sensor bar portion integrally formed with the front plate portion and a rear sensor bar portion integrally formed with the rear plate portion.

3. The airflow measurement device of claim 1, further comprising a total pressure flow channel formed in the flow conditioning plate;
   each sensor bar includes a total pressure port formed therein and facing in a direction toward a front of the flow conditioning plate, each total pressure port is fluidly connected to the total pressure flow channel; and
   a pressure sensor mounted on the flow conditioning plate, the pressure sensor is in fluid communication with the total pressure flow channel.

4. The airflow measurement device of claim 3, further comprising a static pressure flow channel formed in the flow conditioning plate;
   a plurality of static pressure ports formed in the rear plate portion, each static pressure port is fluidly connected to the static pressure flow channel; and
   the pressure sensor is in fluid communication with the static pressure flow channel.

5. The airflow measurement device of claim 1, wherein each sensor bar includes an air flow sensing device mounted thereon and exposed to air flow through the associated plate aperture.

6. The airflow measurement device of claim 4, further comprising a wireless communication device that is configured to wirelessly transmit data from the airflow measurement device.

7. The airflow measurement device of claim 1, further comprising an airflow sensor assembly mounted on the flow conditioning plate, and the airflow sensor assembly includes auto-zeroing.

8. The airflow measurement device of claim 1, further comprising an accelerometer on the flow conditioning plate that determines an orientation of the flow conditioning plate.

9. An airflow measurement device, comprising:
   a flow conditioning plate that includes a plurality of plate apertures therethrough that permit the flow of fluid through the flow conditioning plate;
   each one of the apertures includes a beveled inlet surface; and
   a sensor bar associated with each plate aperture for use in measuring airflow through the associated plate aperture, each sensor bar extending at least partially across its associated plate aperture.

10. The airflow measurement device of claim 9, wherein each beveled inlet surface intersects a front surface of the flow conditioning plate.

11. The airflow measurement device of claim 9, wherein each one of the plate apertures further includes a beveled outlet surface.

12. The airflow measurement device of claim 11, wherein each beveled outlet surface intersects a rear surface of the flow conditioning plate.

13. An airflow measurement device, comprising:
a flow conditioning plate that includes a plurality of plate apertures therethrough that permit the flow of air through the flow conditioning plate;
a sensor bar associated with each plate aperture for use in measuring airflow through the associated plate aperture, each sensor bar extending at least partially across its associated plate aperture;
a total pressure port formed in each sensor bar, each total pressure port faces in a direction toward a front of the flow conditioning plate; and
each total pressure port includes a flow guide that surrounds the total pressure port, each flow guide extends in a forward direction beyond its associated total pressure port.

14. The airflow measurement device of claim 13, wherein each flow guide is configured to guide air flow to its associated total pressure port.

15. The airflow measurement device of claim 13, further comprising a total pressure flow channel formed in the flow conditioning plate, each total pressure port is fluidly connected to the total pressure flow channel; and
a pressure sensor in fluid communication with the total pressure flow channel.

16. The airflow measurement device of claim 15, further comprising a static pressure flow channel formed in the flow conditioning plate;
a plurality of static pressure ports formed on a rear side of the flow conditioning plate, each static pressure port is fluidly connected to the static pressure flow channel; and
the pressure sensor is in fluid communication with the static pressure flow channel.

17. The airflow measurement device of claim 16, wherein each static pressure port includes a flow guide that surrounds the static pressure port, each flow guide extends in a forward direction beyond its associated static pressure port.

18. A system, comprising:
an airflow measurement device having a flow conditioning plate that includes a plurality of plate apertures therethrough that permit the flow of fluid through the flow conditioning plate;
each plate aperture includes an associated sensor for measuring airflow therethrough; and
a one-piece adapter having a central plate and a mounting hole for mounting the flow conditioning plate therein, wherein the one-piece adapter is configured to removably mount the flow conditioning plate thereon with the flow conditioning plate disposed in the mounting hole.

19. The system of claim 18, further comprising a gasket that is secured to a perimeter edge of the central plate.

\* \* \* \* \*